(12) United States Patent
Lee et al.

(10) Patent No.: US 9,300,668 B2
(45) Date of Patent: Mar. 29, 2016

(54) METHOD AND APPARATUS FOR ROAMING DIGITAL RIGHTS MANAGEMENT CONTENT IN DEVICE

(71) Applicant: SAMSUNG ELECTRONICS CO., LTD., Suwon-si (KR)

(72) Inventors: Jae-won Lee, Yongin-si (KR); Seung-chul Chae, Seoul (KR); Kyung-im Jung, Seongnam-si (KR); Young-suk Jang, Uijeongbu-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 146 days.

(21) Appl. No.: 13/869,256

(22) Filed: Apr. 24, 2013

(65) Prior Publication Data

US 2013/0232585 A1 Sep. 5, 2013

Related U.S. Application Data

(63) Continuation of application No. 11/656,403, filed on Jan. 23, 2007, now abandoned.

(30) Foreign Application Priority Data

Feb. 10, 2006 (KR) .................. 10-2006-0013263

(51) Int. Cl.
*G06F 21/10* (2013.01)
*H04L 29/06* (2006.01)
(Continued)

(52) U.S. Cl.
CPC .............. *H04L 63/10* (2013.01); *G06F 21/10* (2013.01); *H04L 63/08* (2013.01); *H04W 12/06* (2013.01); *H04L 2463/101* (2013.01); *H04W 88/02* (2013.01)

(58) Field of Classification Search
CPC ........................................... G06F 21/10
USPC ........................................ 726/26, 27, 29, 3
See application file for complete search history.

(56) References Cited

U.S. PATENT DOCUMENTS 5,757,920 A 5/1998 Misra et al.
6,954,738 B2 10/2005 Wang et al.
(Continued)

FOREIGN PATENT DOCUMENTS

EP 1 465 380 A1 10/2004
JP 6-290152 A 10/1994
(Continued)

OTHER PUBLICATIONS

Office Action issued on Jan. 24, 2011 in the U.S. Appl. No. 11/654,548.
(Continued)

*Primary Examiner* — Alexander Lagor
(74) *Attorney, Agent, or Firm* — Sughrue Mion, PLLC

(57) ABSTRACT

A device includes an authentication unit that issues disposable authentication information to a mobile device which stores a rights object; a receiver that receives a request for remote authentication from an unauthorized device; and a transmitter that transmits a data that approves the remote authentication of the unauthorized device. The data that approves the remote authentication is transmitted to the mobile device via the unauthorized device, a disposable rights object, which is converted from the rights object for a temporary use of content, is transmitted to the unauthorized device according to a result of determining the data, and the mobile device and the unauthorized device are connected via a network.

30 Claims, 5 Drawing Sheets

(51) Int. Cl.
*H04W 12/06* (2009.01)
*H04W 88/02* (2009.01)

(56) References Cited

U.S. PATENT DOCUMENTS

| | | | |
|---|---|---|---|
| 7,458,510 | B1 | 12/2008 | Zhou |
| 7,483,958 | B1 | 1/2009 | Elabbady et al. |
| 2002/0065732 | A1 | 5/2002 | Rodgers et al. |
| 2002/0072926 | A1* | 6/2002 | Morita et al. ............ 705/1 |
| 2002/0166047 | A1* | 11/2002 | Kawamoto ............ 713/169 |
| 2003/0051140 | A1 | 3/2003 | Buddhikot et al. |
| 2004/0117818 | A1 | 6/2004 | Karaoguz et al. |
| 2004/0193874 | A1 | 9/2004 | Kanazawa et al. |
| 2005/0187873 | A1 | 8/2005 | Labrou et al. |
| 2005/0257072 | A1 | 11/2005 | Cross et al. |
| 2005/0257255 | A1 | 11/2005 | Quick et al. |
| 2005/0268098 | A1 | 12/2005 | Oh et al. |
| 2005/0278787 | A1 | 12/2005 | Naslund et al. |
| 2005/0287985 | A1 | 12/2005 | Balfanz et al. |
| 2006/0021065 | A1 | 1/2006 | Kamperman et al. |
| 2006/0294594 | A1* | 12/2006 | Andreaux et al. ............ 726/26 |
| 2007/0086372 | A1* | 4/2007 | Lee et al. ............ 370/328 |
| 2007/0162979 | A1 | 7/2007 | Kamperman et al. |
| 2007/0219917 | A1 | 9/2007 | Liu et al. |
| 2008/0109882 | A1 | 5/2008 | Mahalal et al. |
| 2008/0212779 | A1 | 9/2008 | Persoon |
| 2008/0235810 | A1* | 9/2008 | Staring et al. ............ 726/29 |

FOREIGN PATENT DOCUMENTS

| | | |
|---|---|---|
| JP | 2001351322 A | 12/2001 |
| JP | 2002-163235 A | 6/2002 |
| JP | 2004-46430 A | 2/2004 |
| JP | 2004135021 A | 4/2004 |
| JP | 2004-139238 A | 5/2004 |
| JP | 2004-303111 A | 10/2004 |
| JP | 2005346630 A | 12/2005 |
| KR | 10-2004-0019704 A | 3/2004 |
| KR | 10-2005-0084822 A | 8/2005 |
| WO | 9960749 A1 | 11/1999 |
| WO | 03092222 A1 | 6/2003 |
| WO | 2004/102459 A1 | 11/2004 |
| WO | 2005093989 A1 | 6/2005 |

OTHER PUBLICATIONS

Office Action issued on Aug. 3, 2010 in the U.S. Appl. No. 11/654,548.

Office Action issued on Feb. 23, 2010 in the U.S. Appl. No. 11/654,548.

Office Action Issued on Jul. 7, 2011 in co-pending U.S. Appl. No. 11/654,548.

Japanese Office Action dated Jun. 28, 2011 issued in Japanese application No. 2008-554142.

Office Action mailed Sep. 28, 2011 in co-pending U.S. Appl. No. 11/654,548.

Office Action dated Feb. 29, 2012, in corresponding U.S. Appl. No. 11/654,548.

Communication dated May 30, 2014, issued by the European Patent Office in counterpart European Application No. 07708829.2.

Communication dated Apr. 18, 2014, issued by the United States Patent and Trademark Office in counterpart U.S. Appl. No. 11/654,548.

\* cited by examiner

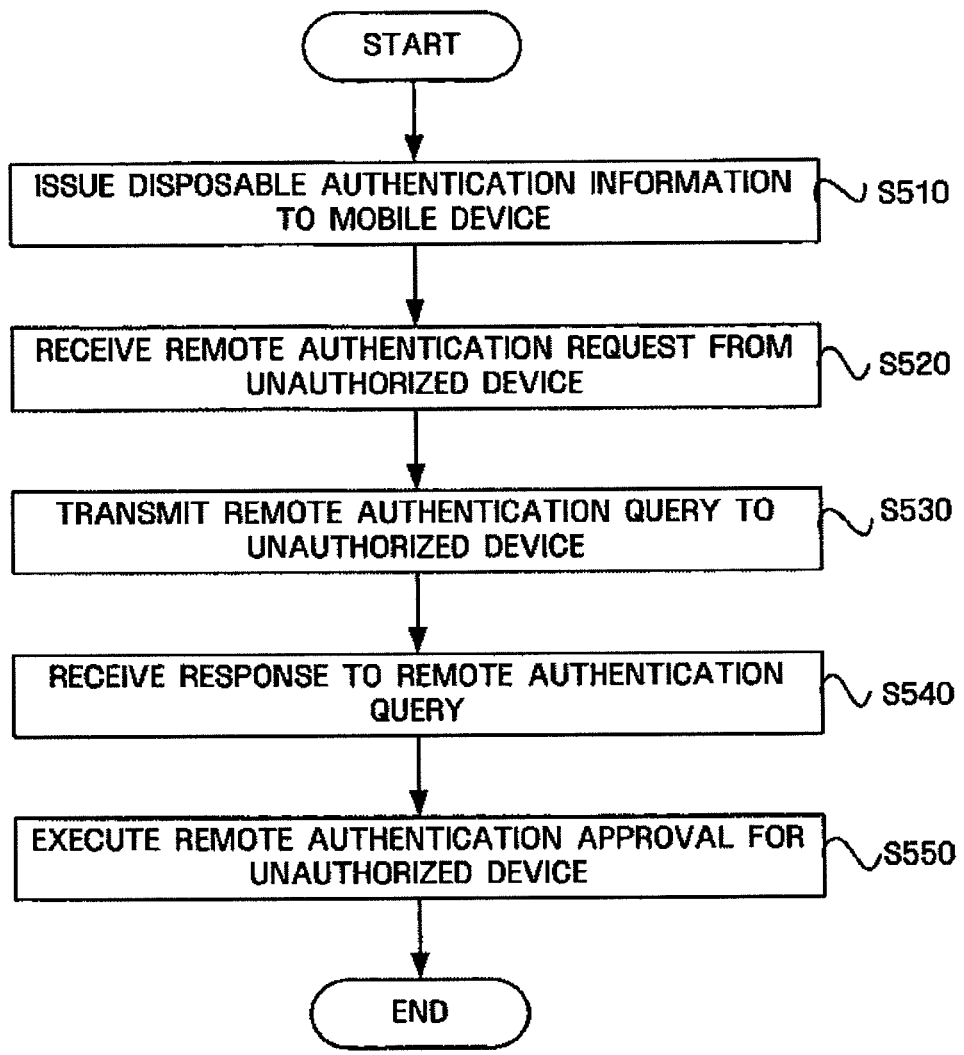

METHOD AND APPARATUS FOR ROAMING DIGITAL RIGHTS MANAGEMENT CONTENT IN DEVICE

CROSS-REFERENCE TO RELATED APPLICATIONS

This application is a continuation of U.S. application Ser. No. 11/656,403 which claims priority from Korean Patent Application No. 10-2006-0013263 filed on Feb. 10, 2006 in the Korean Intellectual Property Office, the disclosures of which are incorporated herein by reference in their entireties.

BACKGROUND OF THE INVENTION

1. Field of the Invention

The present invention relates to a method and apparatus for using digital rights management (DRM) content, and more particularly, to a method and apparatus for roaming the DRM content in a device.

2. Description of the Related Art

DRM was introduced as a way of protecting digital content under copyright. Conventionally, DRM has been applied to the content but the emphasis has gradually changed to the rights object that controls content consumption or use.

In DRM, content can be constrained depending on who owns the rights object. For example, a rights object that allows user A to use content does not allow user B who has this rights object to use the content.

The concept of a domain is applied in DRM, wherein it is deemed that devices in a specific domain are owned by one user allowing the user to use the rights object. Accordingly, the rights object in the domain can be used in the corresponding domain but cannot be used in other domains. In order to be used in other domains, an additional rights object is required.

Due to an increase in wireless Internet and portable digital devices, various attempts have been made to use content by moving a mobile node among different domains. For example, when a mobile node in domain E is moved to domain F and content in a device therein is used, how an available rights object in domain E should be used becomes an issue.

In addition, even when the rights object is not available in units of a domain, it is not easy for other devices to acquire a rights object without an infringement of copyright. Accordingly, this can be a major obstacle to the distribution of DRM systems.

SUMMARY OF THE INVENTION

In view of the above, it is an aspect of the present invention to enable use of content in an unauthorized device via a mobile device.

Another aspect of the present invention is to enable temporary use of content in another device via a mobile device.

The aspects, features and advantages of the present invention will become clear to those skilled in the art upon review of the following description, attached drawings and appended claims.

According to an aspect of the present invention, there is provided a method of enabling roaming of a rights object in a DRM system, the method including issuing disposable authentication information to a mobile device; receiving a request for a remote authentication as well as the authentication information from an unauthorized device; transmitting a query required for the remote authentication to the unauthorized device; receiving a response to the query from the unauthorized device; and transmitting data that approves of the authentication of the unauthorized device to the unauthorized device.

According to another aspect of the present invention, there is provided a method of enabling roaming of a rights object in a DRM system, the method including receiving disposable authentication information from a representative device; requesting an unauthorized device for a remote authentication using the disposable authentication information; receiving the result of the remote authentication from the unauthorized device; and transmitting a disposable rights object to the unauthorized device.

According to a further aspect of the present invention, there is provided a method of enabling roaming of a rights object in a DRM system, the method including receiving a remote authentication request message from a mobile device; requesting the message for remote authentication of a representative device; receiving a query required for the remote authentication from the representative device; transmitting a response to the query to the representative device; and receiving data that approves of the authentication from the representative device.

According to a still further aspect of the present invention, there is provided a device including a rights object storage unit that stores a rights object; an authentication unit that issues disposable authentication information to a mobile device; a receiver that receives a request for remote authentication as well as the authentication information from an unauthorized device; and a transmitter that transmits a query required for the remote authentication to the unauthorized device, wherein the receiver receives a response to the query from the unauthorized device and the transmitter transmits data that approves of the authentication of the unauthorized device to the unauthorized device.

BRIEF DESCRIPTION OF THE DRAWINGS

The above and other features and advantages of the present invention will become apparent by describing in detail exemplary embodiments thereof with reference to the attached drawings, in which:

FIG. 5 is a flow chart illustrating roaming of a rights object, and providing it to a device.

DETAILED DESCRIPTION OF EXEMPLARY EMBODIMENTS OF THE INVENTION

Figure 1:
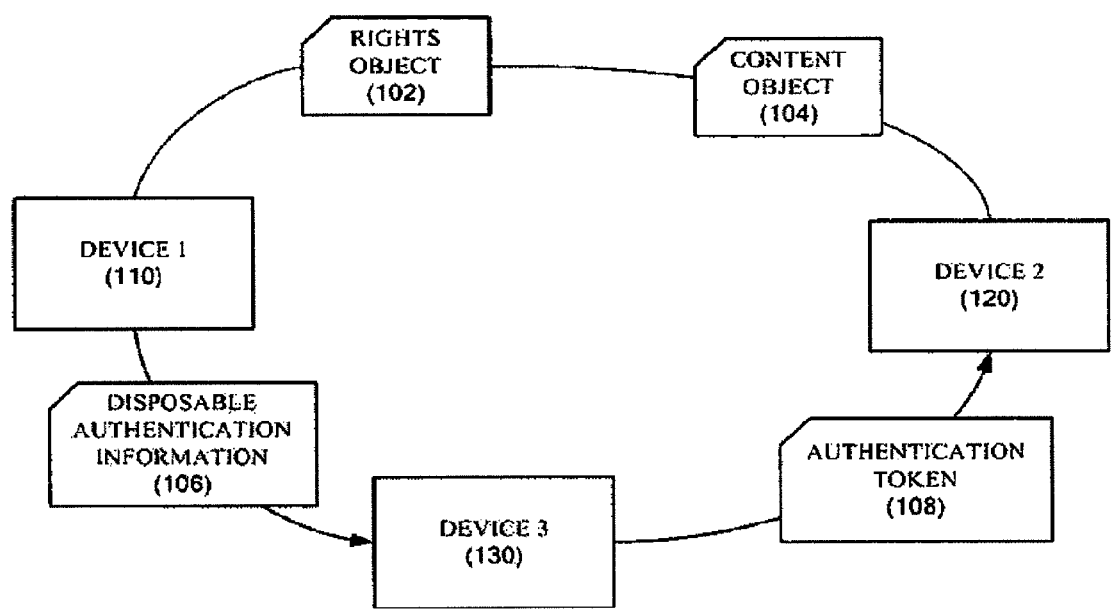
FIG. 1 illustrates the roaming of a rights object in a wireless device according to an exemplary embodiment.

Exemplary embodiments of the present invention will be described in detail with reference to the accompanying drawings.

Advantages and features of the present invention and methods of accomplishing the same may be understood more readily by reference to the following detailed description of the exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims Like reference numerals refer to like elements throughout the specification.

The present invention is described hereinafter with reference to flowchart illustrations of user interfaces, methods, and computer program products according to embodiments of the invention.

It will be understood that each block of the flowchart illustrations, and combinations of blocks in the flowchart illustrations can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded into a computer or other programmable data processing apparatus to cause a series of operational steps to be performed in the computer or other programmable apparatus to produce a computer implemented process such that the instructions that execute in the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order depending upon the functionality involved.

FIG. 1 illustrates the roaming of a rights object according to an exemplary embodiment.

A user has content 104 and a rights object 102 required to use the content. The rights object 102 is acquired from a rights issuer, and stored in a device 1 110. In order to play the content object 104 in a wireless device 2 120 when the user is not an issuee of the rights subject, disposable authentication information 106 acquired from the device 1 110 is stored in a mobile node device 3 130. Then the user moves to device 2 120, executes authentication through the disposable authentication information 106 using the mobile node device 3, acquires the content object 104 and the rights object 102 and uses the content in device 2 120.

Here, the rights object 102 may be the rights object acquired from the rights issuer by the device 1 110, or a second rights object that is newly created to be used in device 2 120.

In FIG. 1, device 3 130 is a medium that facilitates the use of the rights object 102 by device 2 120. An authenticated token 108 is data transmitted while authentication is in progress between device 3 130 and device 2 120. Since device 3 130 is near device 2 120, the device 1 110 can authenticate device 2 120. Hereinafter, a process required for authenticating the device will be described with reference to FIG. 2.

Figure 2:
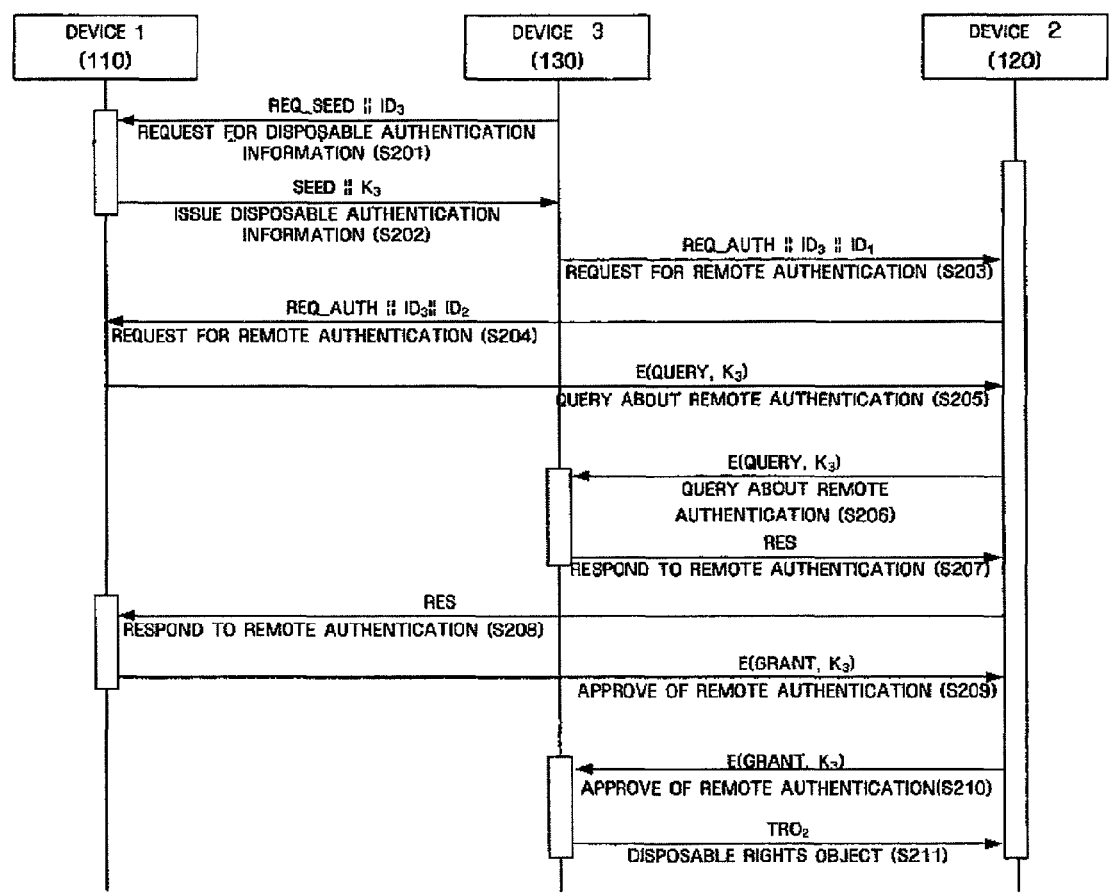
FIG. 2 illustrates an authentication process according to an exemplary embodiment of the present invention.

FIG. 2 illustrates an authentication process according to an exemplary embodiment of the present invention.

A device 3 130 transmits an authentication information-request message REQ_SEED to a device 1 110 with its identifier ID3 S201. The device 1 110 transmits disposable authentication information SEED and a secret key K3 to device 3 130, and stores the SEED. In this case, the transmission may be executed via a neighboring telecommunication medium. The transmission may also be executed by physically connecting device 3 130 to the device 1 110.

Device 3 130 is a mobile node and moves to a position of device 2 120, and transmits a remote authentication-request message REQ_AUTH, the ID3, and the device 1 110's identifier ID1 to device 2 120 via the neighboring telecommunication medium or the physical connection S203.

Device 2 120 refers to ID1 received in S203, and transmits a remote authentication-request message REQ_AUTH∥ID3∥ID2 S204. The remote authentication-request message may be transmitted with ID3 and ID2. The device 1 110 decodes the authentication-request message received in S204, checks whether ID3 matches the identifier stored in its storage and is included in the device certification revocation list, encodes an authentication interrogation in a secret key K3, and transmits it to device 2 120 S205. In this case, the authentication interrogation may input the SEED value generated in S202 as an initial value, acquire the nth pseudo number from a predetermined calculation, and use the n as the authentication interrogation value.

Device 2 120 transmits the encoded authentication interrogation received from the device 1 110 in S205 to device 3 130 via neighboring or physical media S206. Device 3 130 decodes the encoded authentication interrogation in the K3 received in S202 in order to acquire an interrogation value, and outputs the query to a user. The user inputs a response value RES with respect to the query to device 3 130. In this case, the user may receive a pseudo number corresponding to the query from the device 1 110 in S202 as the RES S207.

Device 2 120 transmits the RES to the device 1 110. The device 1 110 allows content playing in device 2 120 if the received RES is true S209. Device 2 120 informs device 3 130 that the remote authentication has been approved S210. Device 130 then transmits the disposable rights object to device 2 120 S211.

Once the content playing has been approved, the content object is transmitted to device 2 120. Device 3 130 or the device 1 110 may be in charge of the transmission of the content object, or device 2 120 may download the content directly from a provider.

Device 3 130 creates a disposable rights object, and transmits it to device 2 120. Along with the remote authentication approval in S209, the device 1 110 may create the disposable rights object and transmit it to the device 120. In this case, steps S210 and S211 may be omitted. The user can use the contents in other devices based on his/her mobile node.

Figure 3:
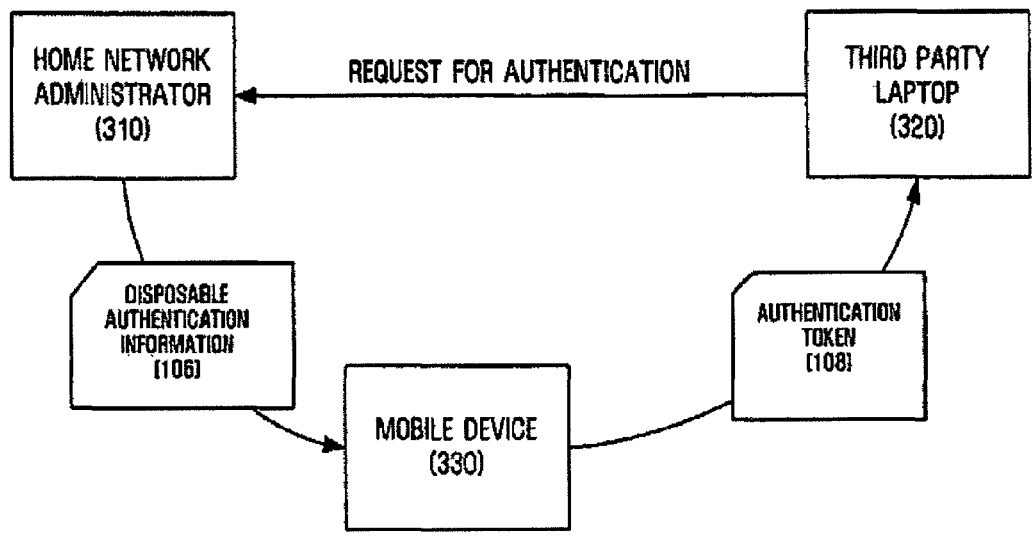
FIG. 3 illustrates an execution process in a home network according to an exemplary embodiment of the present invention.

FIG. 3 illustrates an execution process in a home network according to an exemplary embodiment of the present invention. In FIG. 3, a home network administrator 310 has a rights object and may transmit content to other devices. In FIG. 3, a user wishes play the content on a laptop of a third party 320 but cannot use the rights object of the home network administrator 310 because the laptop belongs to the third party.

Therefore, the home network administrator 310 transmits disposable authentication information 106 to a mobile device 330.

The mobile device 330 creates an authentication token 108 based on the disposable authentication information, and transmits to the third party laptop 320. The third party laptop 320 requests the home network administrator 310 for authentication using the authentication token 108. The third party laptop 320 then executes the authentication process described with respect to FIG. 2, and receives a disposable rights object. As a result, the user can use his/her content on the third party laptop 320 as opposed to his/her own device. The rights object transmitted to the third party laptop is a temporary rights object, and thus, may provide convenience without infringing copyright. Here, the rights object may be transmitted to the third party laptop when the mobile device 330 and the third party laptop 320 are within a prescribed distance, and helps the home network administrator 310 execute an authentication process with respect to the laptop 320 based on the existence of the mobile device 330.

Figure 4:
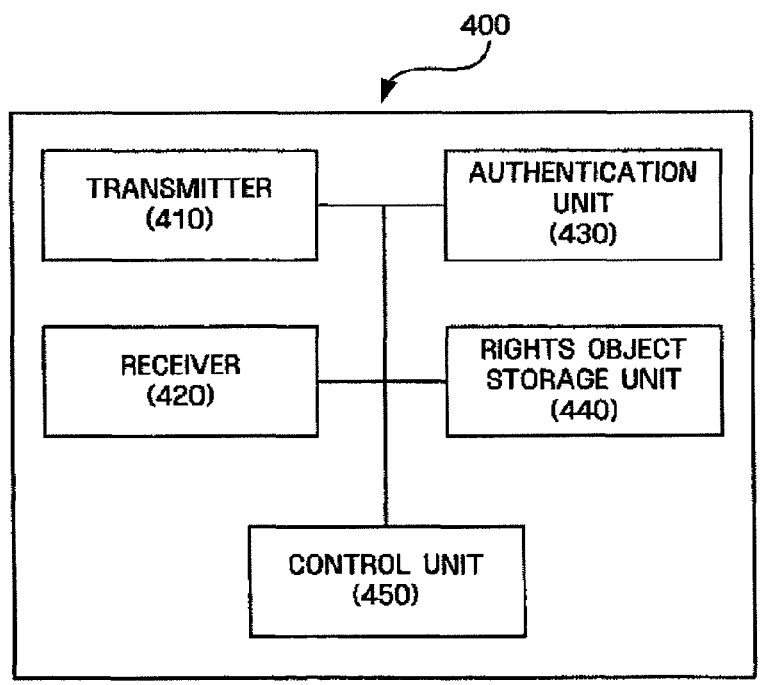
FIG. 4 illustrates a configuration of a device according to an exemplary embodiment of the present invention.

FIG. 4 illustrates a configuration of a device according to an exemplary embodiment of the present invention.

The term "module" means, but is not limited to, a software or hardware component, such as a Field Programmable Gate Array (FPGA) or an Application Specific Integrated Circuit (ASIC), which executes certain tasks. A module may advantageously be configured to reside in the addressable storage medium, and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

FIG. 4 illustrates the configuration of a device working as a home network administrator.

In FIG. 4, a device 400 includes a transmitter 410, a receiver 420, a rights-object-storage unit 440, an authentication unit 430, and a control unit 450. The transmitter 410 transmits authentication-related information in addition to a rights object to other devices. The receiver 420 receives the rights object from a rights issuer, and processes data received from other devices.

The transmitter 410 and the receiver 420 may exist separately or integratedly. Common rights objects are transmitted via a physical connection or a network.

The rights-object-storage unit 440 stores the received rights object. The received rights object may be transmitted to other devices, and a temporary rights object may be created and stored. The rights-object-storage unit 440 may also store information on the devices, which is required in an authentication process. For example, information on an identifier of the device that will receive the corresponding rights object may be stored.

The authentication unit 430 processes the authentication of other devices. As described above, when the disposable authentication information is requested for in the mobile terminal, the authentication unit 430 issues the disposable authentication information, and processes the creation of the query and a remote authentication approval. Accordingly, the identifier stored in advance may be used and a seed may be created for the authentication. Once the remote authentication has been successfully executed, a request may be made for the control unit 450 to transmit the rights object stored in the storage 440.

The control unit 450 controls the aforementioned elements so they can interact with each other. The control unit 450 may also control computational steps in the authentication process, e.g., the comparison of the authentication values, the generation of the query.

The configuration of FIG. 4 may be used as a configuration of a mobile device. In this case, the transmitter 410 and the receiver 420 may provide a function to measure a physical distance from an unauthorized device such as the third party laptop in FIG. 3.

FIG. 5 is a flow chart illustrating roaming a rights object and providing it to a device. An unauthorized device herein is a third party device that plays content, and includes device 2 120 of FIGS. 1 and 2, or a third party laptop 320 of FIG. 3.

A device that manages a home network issues disposable authentication information to a mobile terminal S510. The device may store information on the mobile terminal while issuing the disposable authentication information. When the mobile terminal that has received the disposable authentication information requests the unauthorized device for a remote authentication, the unauthorized device executes the remote authentication request. Accordingly, the device receives the remote authentication request from the unauthorized device S520. The device checks if the identifier of the mobile terminal included in the received remote authentication request matches the stored mobile terminal information in S510, and transmits the remote authentication query to the unauthorized device. Here, the identifier of the mobile terminal is also included and authentication can be executed on the unauthorized device and a remote authentication query is transmitted to the unauthorized device.

Once the unauthorized device has received a response to the remote authentication query via the mobile terminal, it transmits the received response back to the device. Therefore, the device receives the response to the remote authentication query S540, and executes the remote authentication approval to the unauthorized device according to S550. The unauthorized device informs the mobile terminal that it has received the remote authentication approval, receives a disposable rights object, and consumes or uses the content.

Figure 6A:
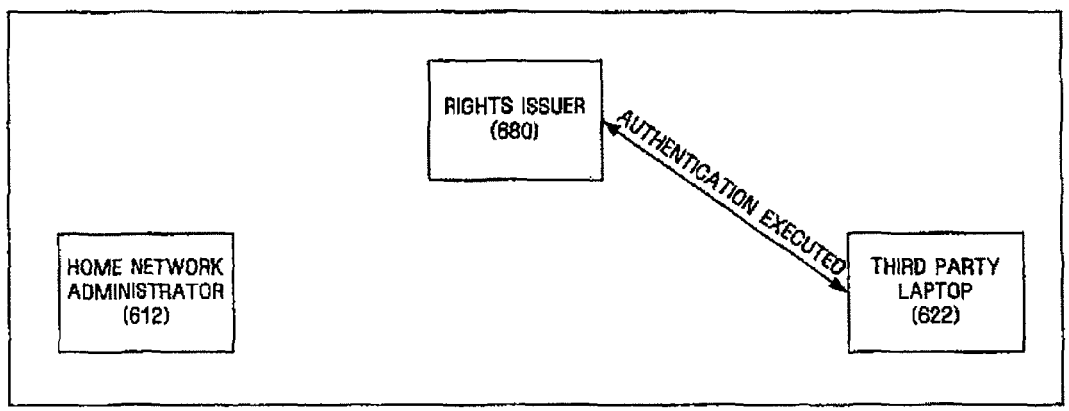
FIGS. 6A and 6B compare methods included herein with related art methods.
Figure 6B:
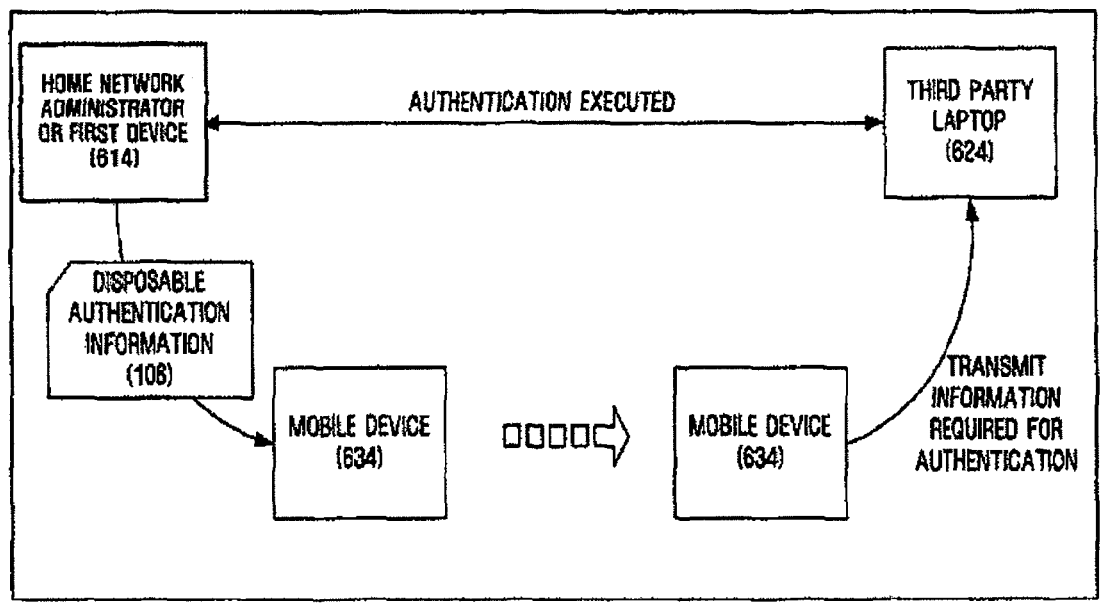

FIGS. 6A and 6B compare methods of the exemplary embodiments included herein with related art methods. In FIG. 6A, a user receives authentication from a rights issuer 680 and a rights object in order to play content in an unauthorized device 622. Accordingly, a home network administrator 612 is not involved therein. However, because authentication must be received from the rights issuer 680 even for a one-time content playing, the use of the content is inconvenient.

In FIG. 6B, on the other hand, a user stores disposable authentication information 106 in a mobile device 634. The user moves the mobile device 634 near a device 624 in another area. Here, content can be roamed only when the mobile device is a predetermined distance away from the third device 624. The distance between the two devices may be measured via a wireless network or infrared ray telecommunications. The third device 624 may execute authentication with the home network administrator or a first device 614 as opposed to the rights issuer 680, and play the content. In addition, the third device 624 can protect a content provider from illegal use of the content by allowing temporary content playing as opposed to permanent content playing.

The mobile device 634 is not limited to telecommunications devices such as mobile phones. The mobile device 634 includes mobile storage devices with a built-in flash memory, digital devices such as laptops and PDAs, and memory cards. The mobile device 634 herein is portable, and refers to all devices including a storage unit that stores disposable authentication information.

As described above, according to the present invention, the following effects can be anticipated.

First, a user can receive proper authentication on purchased content with the help of a remote device.

Second, appropriate content rights are granted to a remote device for user convenience, and content provider benefits are protected by banning indiscreet distribution of the content.

The exemplary embodiments of the present invention have been explained with reference to the accompanying drawings, but it will be apparent to those skilled in the art that various modifications and changes may be made thereto without departing from the scope and spirit of the invention. For example, a digital device that stores the broadcasting content has been described as an example of a filtering interface according to embodiments of the present invention. However, the filtering interface provision method may be applied when a menu is filtered according to user preferences and displayed in digital devices storing digital content such as computers, PDAs, PMPs, mobile phones, and digital broadcasting receivers. Therefore, it should be understood that the above embodiments are not restrictive but illustrative in all aspects.

What is claimed is:

1. A device comprising:
   an authentication unit that issues disposable authentication information to a mobile device which stores a rights object;
   a receiver that receives a request for remote authentication from an unauthorized device; and
   a transmitter that transmits a data that approves the remote authentication of the unauthorized device,
   wherein the data that approves the remote authentication is first transmitted to the unauthorized device in response to the device approving the remote authentication, and then transmitted to the mobile device from the unauthorized device,
   a disposable rights object, which is converted from the rights object for a temporary use of content, is transmitted to the unauthorized device according to a result of determining the data,
   the mobile device and the unauthorized device are connected via a network, and
   the unauthorized device plays the content using the disposable rights object.

2. The device of claim 1, wherein the storage unit stores an identifier of the mobile device.

3. The device of claim 1, wherein the authentication unit checks if an identifier of the mobile device included in the request for the remote authentication matches the stored identifier of the mobile device after receiving the request for the remote authentication.

4. The device of claim 1, wherein the authentication unit checks if the unauthorized device is included in a certification revocation list after receiving the request for the remote authentication.

5. The device of claim 1, wherein the data that approves of the remote authentication of the unauthorized device is encoded in a key included in the disposable authentication information.

6. The device of claim 1, wherein the transmitter transmits a remote authentication query to the unauthorized device.

7. The device of claim 6, wherein the transmitter transmits the data that approves the remote authentication according to a result of determining a response to the remote authentication query.

8. A mobile device of enabling roaming of a rights object in a digital rights management (DRM) system, the mobile device comprising:
   a receiver that receives disposable authentication information from a representative device and a remote authentication query from an unauthorized device;
   an input unit that inputs a response to the remote authentication query; and
   a transmitter that transmits a disposable rights object for a temporary use of content to the unauthorized device according to a result of determining a data that approves the remote authentication of the unauthorized device,
   wherein the data is received from the representative device in response to the response to remote authentication query which has been input via the input unit, by the unauthorized device and then the data is transmitted, from the unauthorized device, and is received by the receiver,
   the mobile device and the unauthorized device are connected via a network, and
   the unauthorized device plays the content using the disposable rights object.

9. The mobile device of claim 8, wherein the remote authentication query, which is encoded, is received from the representative device via the unauthorized device.

10. The mobile device of claim 9, wherein the encoded remote authentication query is decoded using a key included in the disposable authentication information.

11. The mobile device of claim 8, wherein a data, which is encoded, is received from the representative device via the unauthorized device.

12. The mobile device of claim 11, wherein the encoded data is decoded using a key included in the disposable authentication information.

13. A device comprising:
   a transmitter that transmits a request for remote authentication to a representative device;
   a controller that controls transmission of a remote authentication query which is received from the representative device to a mobile device, transmission of a response to the remote authentication query which is received from the mobile device to the representative device, and transmission of a data that approves the remote authentication which is received from the representative device to the mobile device; and
   a receiver that receives a disposable rights object for a temporary use of content from the mobile device,
   wherein the controller is configured to control the receiver to receive the data that approves the remote authentication from the representative device in response to the remote authentication query, and then to control the transmitter to transmit the data that approves the remote authentication to the mobile device,
   the mobile device and the device are connected via a network, and
   the device plays the content using the disposable rights object.

14. The device of claim 13, wherein the request for the remote authentication includes an identifier of the device and an identifier of the mobile device.

15. A method of enabling roaming of a rights object in a digital rights management (DRM) system, the method comprising:

issuing disposable authentication information to a mobile device which stores a rights object;

receiving a request for remote authentication from an unauthorized device; and transmitting a data that approves the remote authentication of the unauthorized device, wherein the data that approves the remote authentication is transmitted first to the unauthorized device, in response to the device approving the remote authentication, and then transmitted to the mobile device, from the unauthorized device, a disposable rights object, which is converted from the rights object for a temporary use of content, is transmitted to the unauthorized device according to a result of determining the data, the mobile device and the unauthorized device are connected via a network, and the unauthorized device plays the content using the disposable rights object.

16. The method of claim 15, further comprising storing an identifier of the mobile device.

17. The method of claim 15, further comprising checking if an identifier of the mobile device included in the request for the remote authentication matches the stored identifier of the mobile device after receiving the request for the remote authentication.

18. The method of claim 15, further comprising checking if the unauthorized device is included in a certification revocation list after receiving the request for the remote authentication.

19. The method of claim 15, wherein the data that approves of the remote authentication of the unauthorized device is encoded in a key included in the disposable authentication information.

20. The method of claim 15, further comprising transmitting a remote authentication query to the unauthorized device.

21. The method of claim 20, further comprising transmitting the data that approves the remote authentication according to a result of determining a response to the remote authentication query.

22. A method of enabling roaming of a rights object of a mobile device in a digital rights management (DRM) system, the method comprising:

connecting to an unauthorized device via a network;

receiving disposable authentication information from a representative device and a remote authentication query from the unauthorized device;

inputting a response to the remote authentication query; and transmitting a disposable rights object for a temporary use of content to the unauthorized device according to a result of determining a data that approves the remote authentication of the unauthorized device, wherein the data is received from the representative device in response to the response to the remote authentication query being input, by the unauthorized device, and then the data is transmitted from the unauthorized device and is received by the mobile device, and the unauthorized device plays the content using the disposable rights object.

23. The method of claim 22, wherein the remote authentication query, which is encoded, is received from the representative device via the unauthorized device.

24. The method of claim 23, wherein the encoded remote authentication query is decoded using a key included in the disposable authentication information.

25. The method of claim 22, wherein a data, which is encoded, is received from the representative device via the unauthorized device.

26. The method of claim 25, wherein the encoded data is decoded using a key included in the disposable authentication information.

27. A method of enabling roaming of a rights object in a digital rights management (DRM) system, the method comprising:

connecting to a mobile device via a network;

transmitting a request for remote authentication to a representative device;

transmitting a remote authentication query, which is received from the representative device, to the mobile device;

transmitting a response to the remote authentication query, which is received from the mobile device, to the representative device;

receiving a data that approves the remote authentication from the representative device in response to the response to the remote authentication query, and then transmitting the received data that approves the remote authentication, to the mobile device;

receiving a disposable rights object for a temporary use of content from the mobile device; and playing the content using the disposable rights object.

28. The method of claim 27, wherein the request for the remote authentication includes an identifier of the device and an identifier of the mobile device.

29. The device of claim 1, wherein the disposable rights object is configured to afford a limited right to play back the content.

30. The device of claim 1, wherein the unauthorized device serves as an intermediary device through which the data that approves the remote authentication is transmitted to the mobile device, which is configured to subsequently transmit the disposable rights object to the unauthorized device.

* * * * *